Patented Oct. 27, 1925.

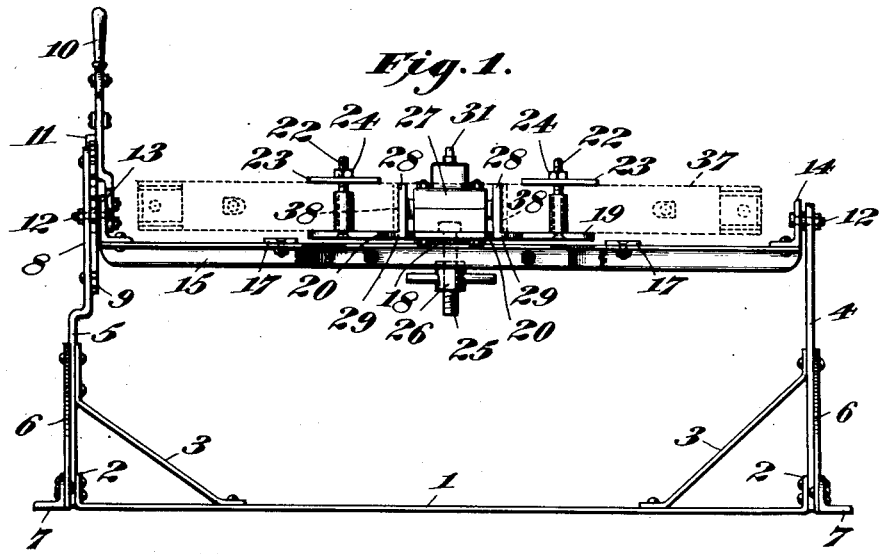
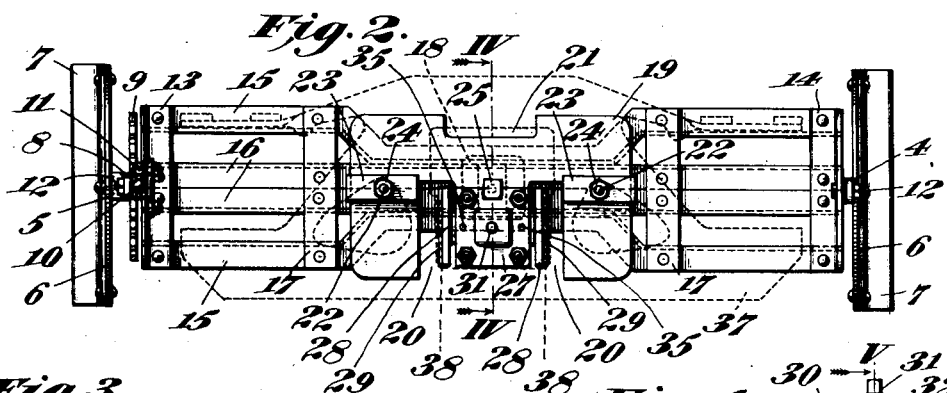
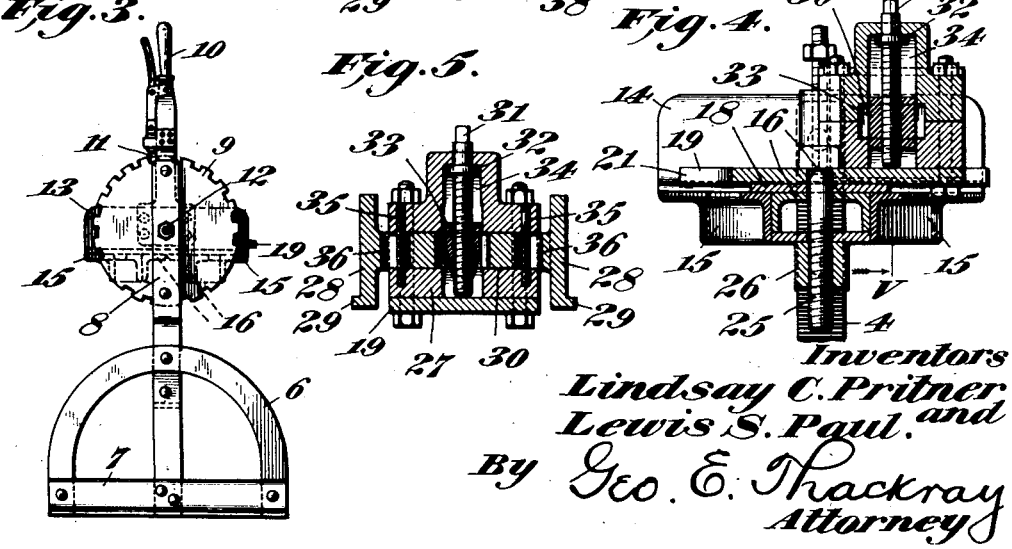

1,559,453

UNITED STATES PATENT OFFICE

LINDSAY C. PRITNER AND LEWIS S. PAUL, OF JOHNSTOWN, PENNSYLVANIA.

WELDING TABLE.

Application filed November 4, 1922. Serial No. 599,098.

*To all whom it may concern:*

Be it known that we, LINDSAY C. PRITNER and LEWIS S. PAUL, citizens of Johnstown, in the county of Cambria and State of Pennsylvania, have invented certain new and useful Improvements in Welding Tables; and we do hereby declare the following to be a full, clear, and exact description of the invention, such as will enable others skilled in the art to which it appertains to make and use the same.

Our invention relates to a table adapted to receive thereon a metal article or articles which are to be welded or otherwise worked upon, and the construction of our table is such that while the article is secured on it in order to facilitate the welding of the same or other work thereon, the table may be tilted, beside which the article is so supported thereon that it may be turned or rotated with respect to the table, so that all portions are easily accessible and in proper position for receiving the welding material, the deposition of which in some cases is assisted by gravity.

In order to simplify the description of our invention we will refer to its use in connection with welding, although it may be used for holding articles to be riveted or otherwise operated upon as will be readily understood.

The particular table illustrated herein is shown for use when welding various portions of side frames composing parts of railway car trucks of the character shown in Patents 1,422,704, dated July 11, 1922, and 1,431,687, dated Oct. 10, 1922, and similar side frames, but at the same time it can be used or adapted to be used in holding any articles to be operated upon or to be welded, requiring easy change of position in order to save time and labor in such operations.

Our table consists of a framework adapted to be set on the ground or on any convenient support, and the platform of the table is mounted on pivots thereon so that it may be tilted sideways thereon or turned through an entire circle if desired and held at any predetermined angle. The platform of the table is also provided with an intermediately arranged pivot or king bolt adapted to rotatably secure an article thereon, the axis of this pivot being at substantially right angles to the axes of the other pivots, and the side frame may be turned thereon to any extent. By reason of this double pivoted construction the article may be turned to assume any position whatsoever, and means are also provided for temporarily locking it with respect to both sets of pivots.

In addition to this, certain portions, such as column guides, have to be welded to the side frame, and we provide special clamping arrangements for holding these separate pieces correctly in position at the exact location and proper distance apart, so that when they are welded to the frame they will be properly located and held.

Our table also has its end pivots arranged at a certain distance above its general upper surface so that the center of gravity of the table itself and of the frame supported thereby is substantially on the line of the axis of said pivots, thereby conducing to ease of operation.

Having thus given a general description of our invention, we will now, in order to make the matter more clear, refer to the annexed sheet of drawings, which forms part of this specification, and in which like characters refer to like parts.

Figure 1 is a front elevation of our improved welding table; Figure 2 is a top plan view thereof; Figure 3 is an end elevation; Figure 4 is a vertical transverse sectional elevation through the central portion of the welding table taken on the line IV—IV of Figure 2, drawn on a larger scale, and Figure 5 is a vertical longitudinal section through the central portion of the table taken on the line V—V of Figure 4.

Referring now to the characters of reference on the drawings:—1 is the centrally located base bar with upturned end portions 2 secured to the angle-shaped foot members 7 as illustrated. Standards or legs 4 and 5 are provided as illustrated, having brace members 6 secured thereto and to the foot members 7 as illustrated, and this frame work is braced in a longitudinal direction by means of diagonal braces 3 secured thereto as shown. The leg or standard 5 has an upper offset portion 8 for the purpose of providing clearance for the moving parts as illustrated. A toothed or notched wheel 9 is firmly secured to this offset portion 8 and at its center the inner end of the lever 10 is rotatably mounted, secured to the table and has a pawl or detent mechanism having a tongue 11 adapted to fit within the notches of the wheel 9 in order to hold the table in any laterally inclined position desired. The table may either be level as illustrated in Figure 1, or it may be rotated around its end pivots 12 and held at any angle desired, the position being maintained as before stated by the action of the detent mechanism and notched wheel 9. The movable table proper is provided with end angle portions 13 and 14 and with side angle members 15 secured together as shown, and in addition to this it has two central angle portions 16 extending longitudinally thereof. The table is further braced and held together by means of cross tie plates 17, which are secured to the various longitudinal members. At the center of the table we provide a bearing plate 18 and on top of this is mounted a bed plate 19 of the form illustrated, provided with notches or cut-out portions 20 and 21 in order to provide ready access to the different parts of the article to be welded. A side frame 37, which is in position to be welded, is illustrated in dotted lines in Figures 1 and 2, is held in place by means of the clamping bolts 22 with nuts 24 and the cleats or washers 23, and the frame is further held in position by means of the clamping mechanism indicated in Figures 1 and 2 and in more detail in Figures 4 and 5. The clamping bolts 22 are provided with nuts 24, which when screwed down on the cleats 23, will clamp the frame in position on the table. In addition to this clamping means we provide a pivot or king bolt 25 mounted in the bed plate 19, extending through the base plate 18 and having a nut 26 on its threaded end. The upper end of this king bolt is provided with a square head, which is seated in a groove of the housing 27. 28 are clamping heads adapted to operate in the housing 27 and to be forced outwardly by the action of the wedge-shaped nut 33 mounted on the threaded adjusting screw 31 having an annular flange 32, which adjusting screw is provided with a square head and may be turned with a wrench or by a removable crank mounted thereon. The clamping heads 28 are adapted to receive the column guide portions 38 of the side frame and to support the same by means of their bottom flanges 29. The column guides 38, which may be flat or other shaped pieces of metal, are placed in position against the clamping heads 28 with their edges resting on the flanges 29, and these heads 28 are then projected outwardly to force the column guides firmly against the interior of the bolster opening in the side frame and to hold them in exact position or location ready for welding their edges thereto. After this in done the clamping heads are withdrawn prior to the removal of the frame. The housing 27 is provided with grooves or ways 30 adapted to receive the inner guide portions of the clamping heads, and these heads are provided with slotted openings 36 and are retained in position by the pins 35 passing therethrough. The two portions of the housing are held together by four bolts provided with nuts as illustrated. The interior of the housing is provided with an opening 34 in which the wedge nut 33 is adapted to move. The column guides 38 referred to are indicated in dotted lines.

Having thus given a general description of our invention we will now describe its operation:—The welding table being in the position illustrated in Figures 1 and 2, a side frame 37 is placed thereon and clamped centrally in position by means of the clamping bolts 22 and the cleats or washers 23. The welding of these parts may then be accomplished, and in order to facilitate this the table may be tilted to any angle laterally by rotating the same around the pivots 12, and the operator may do this by pushing or pulling on the handle or lever 10, and may secure the table in any laterally tilted position or location by inserting the decent 11 in any of the notches of the circular notched wheel 9. At the proper time the column guides 38 are inserted against the clamping heads 28, the flanges 29 of which support their lower edges in the proper position, and the adjusting screw 31 is then screwed in such a way as to move the wedge nut 33 downwardly, which thereby forces the clamping heads outwardly and firmly braces the column guides in position against the inside of the frame, holding them in exact position within the bolster opening. The edges of these column guides may then be welded, after which the clamping heads are retracted by the reverse movement of the screw 31. When it is desired to have access to any member and to facilitate the flowing of the welding material, the frame may also be rotated around the king bolt 25, and in order to facilitate this the nut 26 may be loosened and if desired may be tightened when the frame is in a suitable position, and thus hold it there for welding or any other operation.

Various portions of the frame may have to be welded and our table provides ready means for holding the frame in any position whatsoever in order to assist the operator in his work and aid in the flow of metal with the help of gravity. After the frame is welded it is then removed and another may be placed in position and the operation proceeds as before.

Although we have shown and described our invention in considerable detail, we do not wish to be limited to the exact and specific details thereof as shown and described, but may use such modifications in, substitutions for, or equivalents thereof as are embraced within the scope of our invention, or as pointed out in the claims.

Having thus described our invention, what we claim and desire to secure by Letters Patent is:—

1. A welding table provided with a pair of fixed supports, a table having its ends journalled in said supports, means for rotating said table on said journals and for holding it in any inclined position desired, means on said table for securing a side frame of a railway truck thereto, and means for clamping and holding column guides in position against said frame.

2. A welding table having a pair of fixed supports, an inclinable table having its ends pivoted in said supports and provided with means for holding it in any inclined position desired, means for securing a side frame of a railway truck on said table, a central pivot mounted on said table provided with means adapted to support said frame, whereby said frame may be held in any position as may be desired.

3. A welding table provided with means for securing a side frame of a railway truck thereon, a pair of oppositely disposed clamping heads adapted to receive column guides, means for forcing said clamping heads in such a way that said column guides are firmly projected and held against the sides of the bolster opening of the frame.

4. A welding table provided with a pivoted bed plate, means for securing a side frame of a railway truck thereon, a pair of oppositely disposed clamping heads on said bed plate, each provided with a flange adapted to receive and support column guides to be attached to said side frame, and means for forcing said clamping heads toward the frame so that said column guides are firmly projected against the side frame column members in order to hold them in position thereagainst.

5. In a welding table of the character described, a central bed plate having a housing, a pair of clamping heads mounted therein and adapted to be retracted and projected therefrom, an adjusting screw mounted in said housing, and a tapered nut mounted on said screw, whereby when said screw is turned in one direction said wedge nut forces the clamping heads outwardly.

6. In a pivotally mounted welding table of the character described, a bed plate having a central housing pivotally mounted thereon by means of a king bolt provided with a nut adapted to secure it in position desired, a pair of clamping heads mounted in the housing and adapted to be retracted and projected therefrom, an adjusting screw mounted in said housing, and a tapered nut mounted on said screw, whereby when said screw is turned in one direction the tapered nut forces the clamping heads outwardly.

7. In a pivotally mounted welding table of the character described, means for laterally inclining and securing same in various inclined or other positions, a bed plate having a central housing mounted therein, a pair of clamping heads mounted in said housing and adapted to be retracted and projected therefrom, an adjusting screw mounted in said housing, a tapered nut on said screw, whereby when said screw is turned in one direction the tapered nut forces the clamping heads outwardly, said housing being pivotally mounted on the table by means of a king bolt provided with a nut adapted to secure it in any position desired.

In witness whereof we hereunto affix our signatures.

LINDSAY C. PRITNER.
LEWIS S. PAUL.